March 2, 1954 J. L. AASLAND 2,670,839
REMOTE CONTROL FOR DISCHARGE HOODS
Filed May 13, 1952 3 Sheets-Sheet 1
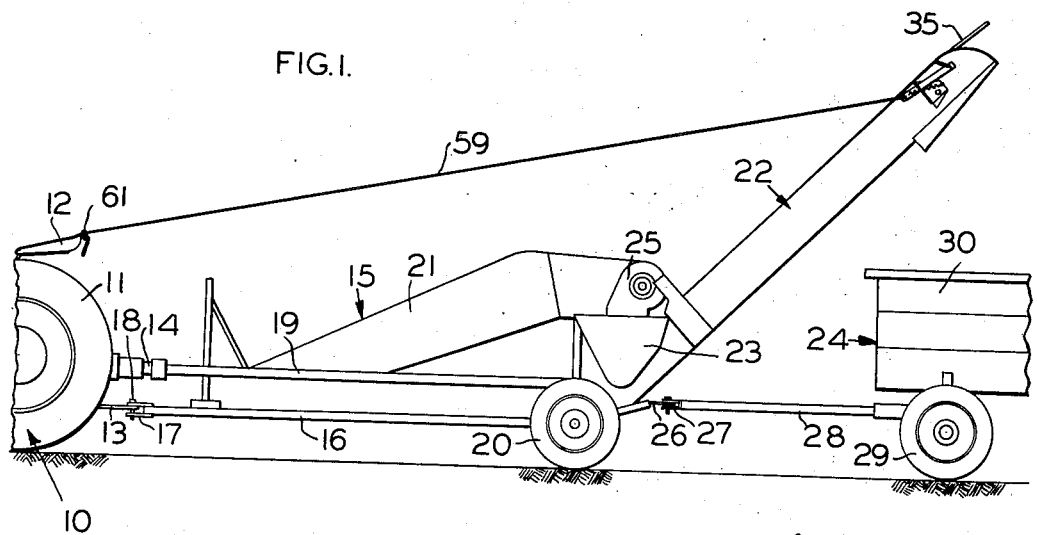
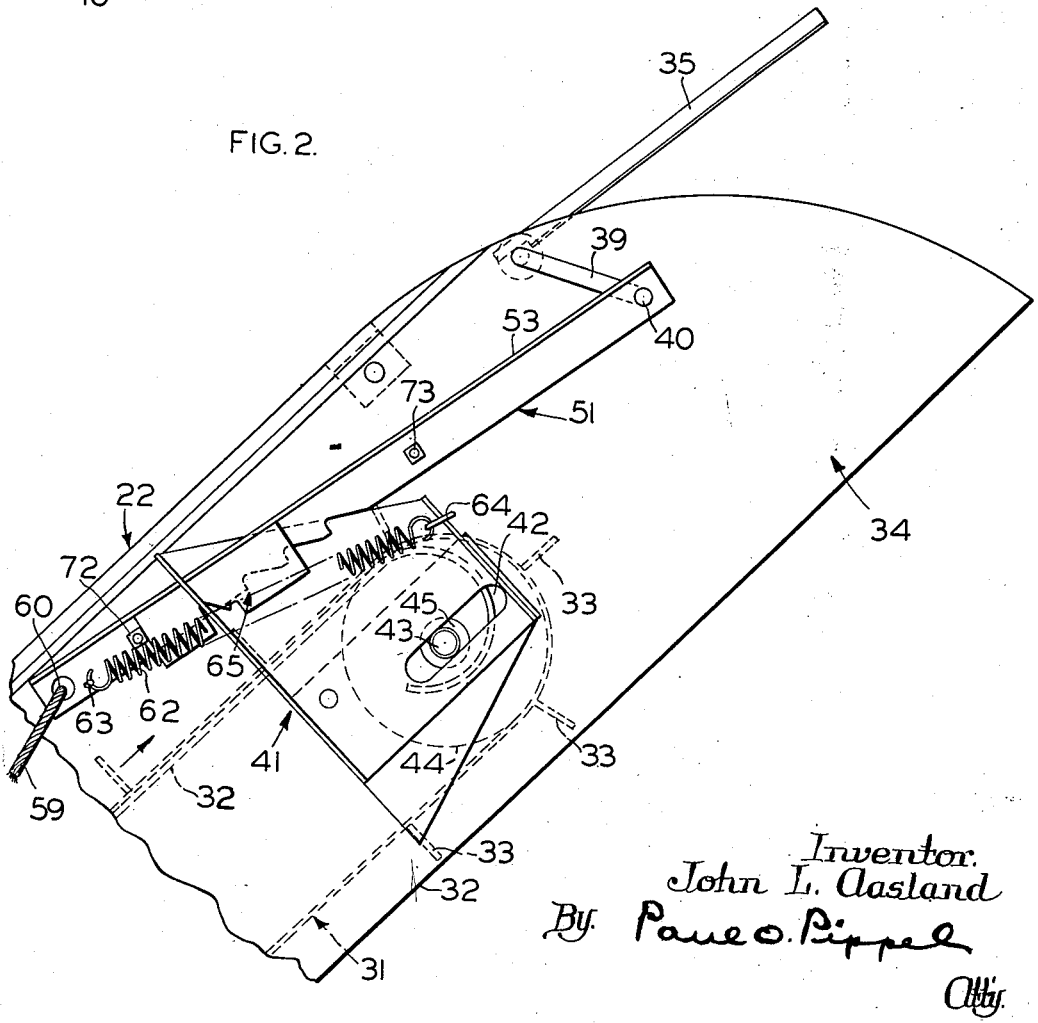
Inventor.
John L. Aasland
By Paul O. Pippel
Atty.

March 2, 1954  J. L. AASLAND  2,670,839
REMOTE CONTROL FOR DISCHARGE HOODS
Filed May 13, 1952  3 Sheets-Sheet 2

Inventor.
John L. Aasland
By Paul O. Pippel
Atty.

March 2, 1954
J. L. AASLAND
2,670,839
REMOTE CONTROL FOR DISCHARGE HOODS
Filed May 13, 1952
3 Sheets-Sheet 3
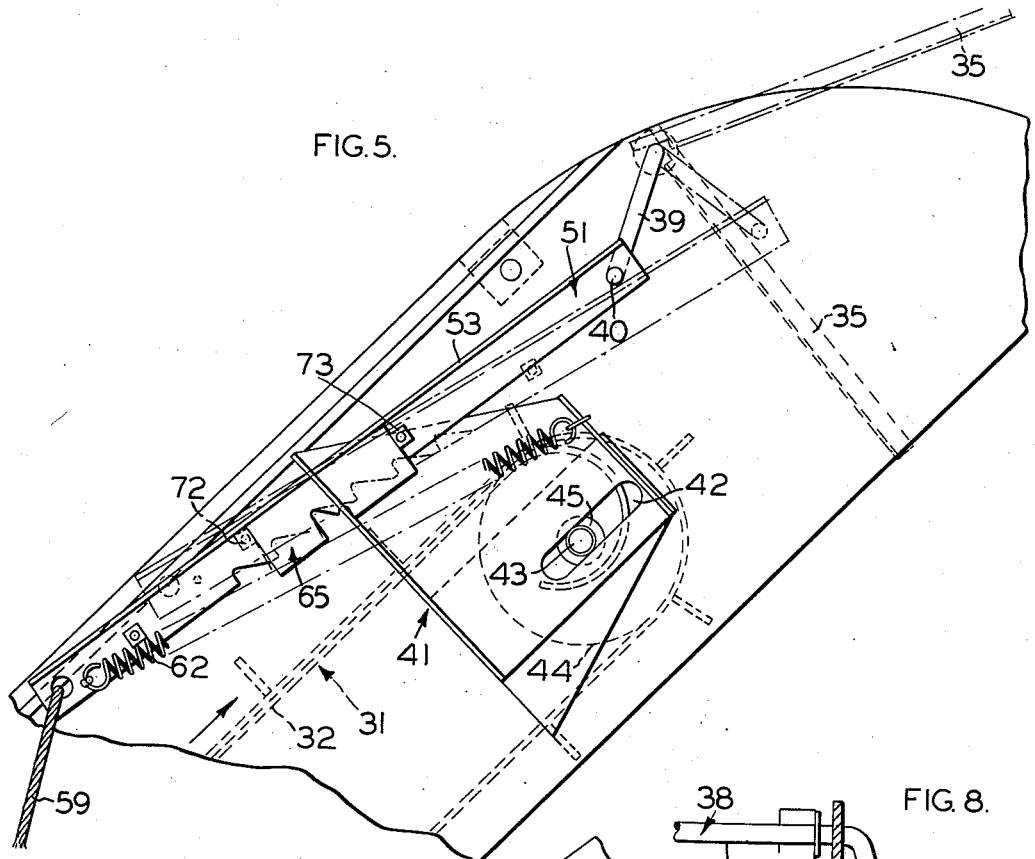
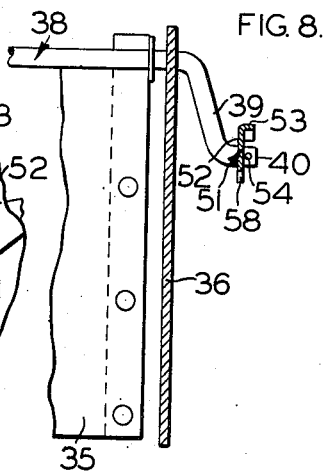
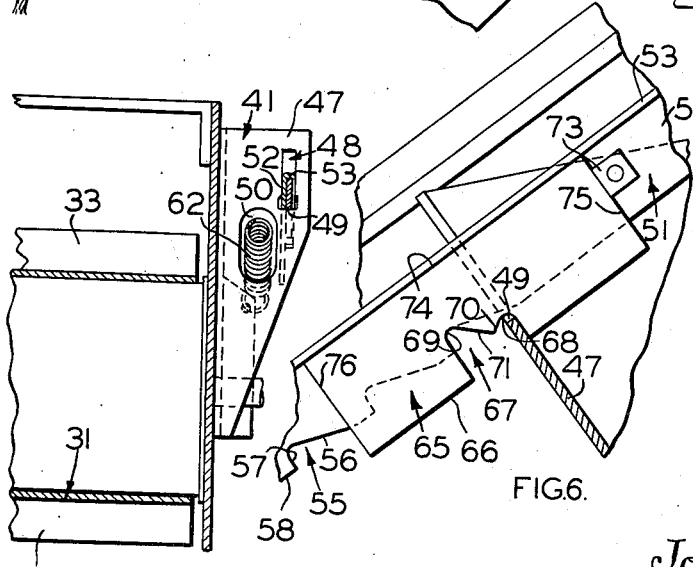
Inventor.
John L. Aasland
By Paul O. Pippel
Atty Patented Mar. 2, 1954

2,670,839

UNITED STATES PATENT OFFICE 2,670,839

REMOTE CONTROL FOR DISCHARGE HOODS

John L. Aasland, Moline, Ill., assignor to International Harvester Company, a corporation of New Jersey Application May 13, 1952, Serial No. 287,545

5 Claims. (Cl. 198—228)

This invention relates to a new and improved remote control for a series of increment adjustments.

It has long been of particular interest to users of agricultural machinery to be able to effect changes in position or changes in operational position of remotely positioned elements by flexible rope means.

It is, therefore, a principal object of this invention to provide for a plurality of adjustments of a remotely positioned element upon successive pullings and releasings of a rope.

An important object of this invention is the provision of means in a remotely operable device for providing a series of increment adjustments upon the successive pulling and releasing of a rope and, further, to automatically repeat the series of increment adjustments upon continued pulling and releasing of the same.

Another important object of this invention is to supply a deflector for the discharge end of a wagon elevator and to have means operable by successive pullings and releasings of a single rope to accomplish a plurality of angular adjustments for the deflector and to continuously repeat the various adjustments upon continued pullings and releasings of the rope.

Still another important object of this invention is to provide a remote control operating means having a member with a plurality of spaced notches therein for effecting successive operational positions of a member and having a member releasing means in association with the member to provide for a repetition of the notched adjustments after all of the notches have been preliminarily used to effect a locking of the member in those positions.

Other and further important objects of this invention will become apparent from the disclosures in the following specifications and accompanying drawings.

In the drawings:

Figure 1 is a side elevational view of a plurality of vehicles in operation and including a tractor, a trailing corn picker and a trailing corn receiving wagon;

Figure 2 is an enlarged side view detail of the upper end of the corn picker wagon elevator as shown in Figure 1;

Figure 5 is a view similar to Figures 2 and 3 wherein a still further adjustment of the device has been made;

Figure 6 is an enlarged detail, partly in section, of a portion of the operating device as shown in Figure 5;

Figure 7 is a sectional view taken on the line 7—7 of Figure 3;

Figure 8 is a sectional view taken on the line 8—8 of Figure 3.

Figure 4:
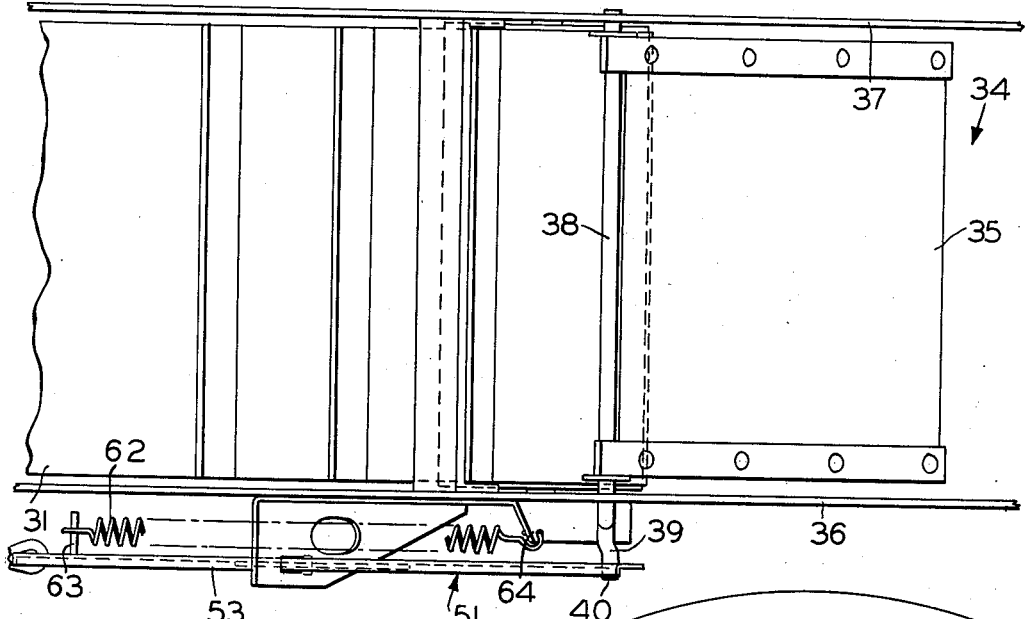
Figure 4 is a top plan view of the device as shown in Figure 3.

As shown in the drawings, the reference numeral 10 indicates generally a tractor or the like arranged and constructed to pull a trailing agricultural implement. Tractor 10 is of the farm type having a relatively large rearwardly disposed traction wheel 11 with an operator's seat 12 positioned substantially at the rear of the tractor. The tractor is of standard construction and the forward end thereof has not been completely shown. The tractor 10 is further provided with a drawbar 13 and a power takeoff shaft 14 spaced vertically, one above the other, and projecting from the rear of the tractor.

A pull type corn picking machine, designated generally by the numeral 15, has a forwardly projecting hitch frame 16 with a clevis 17 on the forward end thereof which is fastened to the tractor drawbar 13 by means of a removable pin 18. A driving shaft 19 joins the tractor power takeoff shaft 14 and delivers rotational power back to the operating mechanisms of the corn picker 15.

The corn picker is supported on a rearwardly disposed wheeled truck 20 and includes a forwardly and downwardly projecting harvesting portion 21 and an upwardly and rearwardly extending wagon elevator 22. Intermediate the harvesting and elevating members 21 and 22 there is a crop-receiving hopper 23 adapted to receive delivery of harvested material from the crop-gathering portion 21 and thereafter delivering it to the elevator 22 for upward and rearward elevation for eventual discharge into a trailing wagon identified generally by the numeral 24. A cleaning fan 25 is disposed over the crop-receiving hopper 23 and is adapted to separately discharge much of the trash which is picked with the corn or other crop by the gathering mechanism 14.

The corn picker 15 has a drawbar or the like 26 comparable to the tractor drawbar 13 and is adapted to be engaged by a clevis 27 formed on the forward end of a tongue 28 of the trailing wagon 24. The forward steerable wheel truck 29 of the wagon 24 is shown in Fig. 1 of the drawings but the rear portion of the wagon has been cut away inasmuch as it forms no part of the present invention and is of standard construction. The wagon box or crop-receiving portion of the wagon is shown at 30.

As shown in Figure 2, the wagon elevator 22 is provided with an overshot conveyor 31 which delivers harvester crop upwardly on top of the conveyor bottoms 32 of the elevator 22 by reason of the regularly spaced cross slats or flight members 33. The upper and rearmost end of the wagon elevator 22 constitutes the discharge end 34 thereof through which the harvested and elevated crop is projected for deposit in the trailing wagon box 30.

Without auxiliary means and with a constant speed running elevator conveyor 31 the crop would be deposited in one position within the wagon box. This, of course, contributes to inefficient, uneven loading of the wagon and it is thus desirable to have means capable of dispersing the harvested crop over the full area of the trailing wagon.

Thus, in order to accomplish this uniform spreading over the full surface of the wagon box 30, a crop-deflecting member or flap 35 is disposed within the discharge end 34 of the wagon elevator 22. As best shown in Figure 4 the discharge end 34 includes a pair of spaced-apart side members 36 and 37 between which is positioned the elevator conveyor and the deflector flap 35. The deflector member is affixed at its one end to a rod 38 which is journaled within the spaced-apart side plates 36 and 37 and thus constitutes a hinge pin about which the flap 35 may be moved for various angular positions of the deflector within the discharge end 34 of the wagon elevator. As best shown in Figure 8, the hinge rod 38 has a downwardly bent end portion 39 adjacent to and just laterally outside of the side plate 36 of the discharge portion 34 of the wagon elevator. At the lower end of this bent end 39 there is a still further bent portion 40 which lies parallel to the main horizontal portion 38. It will thus be apparent that fore and aft swinging movement of the bent ends 39 and 40 of the hinge pin 38, as shown in Figs. 1, 2, 3 and 5, will cause the adjustable positioning of the deflector flap 35.

A bracket 41 is fixedly mounted by any suitable means such as welding to the side plate 36 and is equipped with an elongated slot 42 therein for lateral passage therethrough of a shaft 43 which carries a pulley 44. The pulley 44 receives the upper end of the conveyor belt 31 in the wagon elevator. It should be understood that the shaft 43 carried in a bearing 45 may be adjustably positioned at any location within the elongated slot 42 to effect proper tautness of the conveyor belt 31.

The bracket 41 is provided with spaced-apart parallel flanges 46 and 47. The forwardly disposed flange 47 has an opening 48 therethrough which is substantially rectangular in shape and includes four sides, the lower edge of which is identified by the numeral 49. A second opening 50 is provided in the flange 47 at a position spaced from the opening 48.

A relatively elongated member 51 in the form of a right angle is adapted for sliding through the rectangularly shaped opening 48 in the bracket flange 47. The member 51 is shown, in detail, in several of the side views and in Figs. 7 and 8 wherein it is shown there is a substantially upright wall portion 52 and a bent-over or flanged top 53. Figure 8 further shows the attachment of the rearmost end of the member 51 to the portion 40 of the hinge shaft 38. The bent portion 40 of the hinge rod 38 passes through the member 51 and by reason of a cotter pin 54 the member 51 is held in position on the bent end 40 of the hinge rod. Endwise movement of the member 51 thus causes direct angular shifting of the deflector 35.

The member 51 has the lower edge of its vertical wall 52 equipped with a series of regularly spaced notches 55. Each of the notches 55 has an inclined surface 56 and a relatively vertically positioned surface 57 extending upwardly from the lower edge 58 of the wall 52 of the member 51. A rope 59 is attached to the forward end of the member 51 at 60. The forward end of the rope or flexible cable is attached at 61 to a position adjacent the operator's seat 12 for convenient reaching by an operator's hand. A spring 62 is anchored at 63 to the member 51 adjacent the rope attachment at 60. The spring 62 is of the coil extension type and passes rearwardly through the opening 50 in the flange 47 of the bracket 41 and is attached at its rear end at 64 to the spaced-apart flange 46.

As best shown in Figure 2, the forwardly disposed notch 55 in the series of regularly spaced notches is positioned within the rectangular opening 48 in the flange 47 with the notch engaging the lower edge 49 of that opening. The coil spring 62 is arranged in such a manner that there is constantly exerted a rearward and upward pulling of the member 51, thus a forward and downward pulling of the flexible rope 59 by the tractor operator will pull the member 51 against the action of the spring 62 and cause the member 51 to ride along the inclined surface 56 of the notch in engagement with the lower edge 49 of the opening 48, thus causing the eventual engagement of the second of said notches with the ledge 49.

A separate plate member 65 is positioned against the back wall 52 of the elongated member 51. The plate 65 is disposed beneath the top flange 53 of the member 51 and when the members 51 and 65 have relative movement with respect to each other the plate 65 slides on the under surface of the top flange 53 of the member 51. The plate 65 is relatively short compared to the length of the member 51 but its height exceeds the height of the member 51. The lower edge of the plate 65 is designated by the numeral 66 and has cut therein a dual notch 67 which comprises a shallow cutout or slot 68 and a relatively deep slot 69. These slots 68 and 69 are joined by oppositely inclined walls 70 and 71. The plate member 65 is arranged and constructed to be positioned within the rectangular opening 48 in the bracket 41 and is further positioned so that the dual notch 67 engages the lower edge 49 of the rectangular opening 48. When the device is in assembled position, as shown in the drawings, the plate member 65 remains within the opening 48 throughout all operations of the adjusting mechanism; however, the plate does have limited endwise movement within the opening 48 so that at various times during the operation of the device the shallow slot 68 will engage the lower edge 49 of the opening 48 and at still other times the deep slot 69 will engage the ledge 49.

Figure 3:
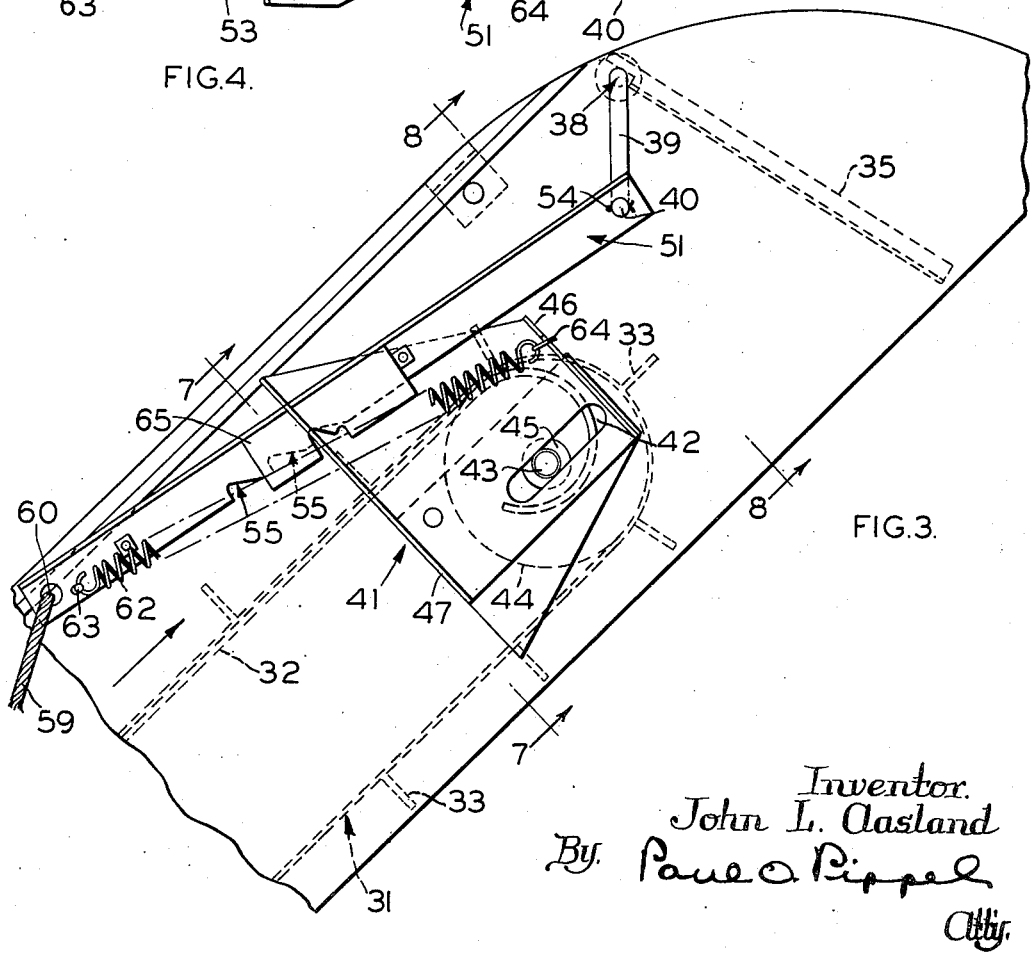
Figure 3 is another enlarged side view detail, as in Figure 2, with a crop deflecting device in adjusted position.

As best shown in Figs. 2 and 3, the elongated member 51 is provided with spaced-apart projections 72 and 73 at the forward and rearward portions respectively. These projections are mounted on the vertical wall 52 of the member 51 and project inwardly in the same direction as the top flange 53. The projections thus are in the path of the plate 65 and although under the majority of operations of the device of this invention the member 51 moves separately to effect changes in adjustment, there are those special times when longitudinal movement of the member 51 will cause a concurrent longitudinal movement of the plate 65 by reason of the engagement of either of the projections 72 or 73 with the plate. It should be pointed out that the slot 69 is sufficiently deep so that the remaining height of the plate 65 between the root of the slot 69 and the top surface of the plate, identified by the numeral 74, is less than the height of the member 51 between its lower edge and its top flange. Conversely, the depth of the slot 68 is sufficiently shallow so that the remaining height of the plate 65 between the root of the slot 68 and the top 74 is still a sufficient height to be in excess of the member 51.

In the operation of the device let us assume that the wagon elevator deflector 35 is in its uppermost position, as shown in Figs. 1 and 2, so that harvested material being carried up the wagon elevator 22 will be deposited in the rear portion of the wagon box 30. In order to lower the deflector 35 the operator grabs hold of the rope 59 and pulls it forwardly, directly causing the member 51 to be pulled against the action of the spring 62, thus sliding the member 51 into the succeeding notch 55 on the underside of the member 51 for engagement with the lower ledge or surface 49 of the rectangular opening 48 in the bracket 41. The inclined wall 71 leading from the deep slot 69 to the adjoining inclined wall 70 of the slot 68 has a depth greater than the depth of the notch 55 in the member 51; thus, the plate member 65 remains longitudinally stationary with respect to the bracket 41 when the deep slot 69 engages the top surface 49 of the opening 48. The operator may therefore select any position for the member 51 merely by pulling and releasing the rope 59 and stopping in any one of the series of regularly spaced adjusting notches 55 whereupon the deflector 35 may be adjusted throughout the range of positions as best shown in Fig. 5 wherein the deflector 35 is shown in its two limiting positions. Figure 3 shows the device when the member 51 has its rearmost notch 55 engaging the ledge 49 of the opening 48 in the member 41. At this point a further pulling of the rope 59 causes the projection 73 on the member 51 to engage the rearward end 75 of the plate causing the plate 65 to have concurrent forward movement with the member 51. This causes the dual notch 67 to shift in relationship to the flange 47 of the bracket 41 whereupon the shallow slot 68 ultimately engages the ledge 49 of the opening 48, as shown in Fig. 6. The engagement of the top surface 74 of the plate 65 with the underside of the flange 53 of the member 51 has thus caused the member 51 to be raised out of proximity with the engaging ledge 49 of the bracket opening 48. This is true because the height between the shallow slot 68 and the top surface 74 of the plate 65 is greater than the height of the entire member 51. Figure 6 shows the position of the device when the rope 59 is under tension and is being pulled by the operator. A subsequent releasing of the rope 59 will permit the member 51 to move to its rearmost position, as shown in Fig. 2. Intermediate the stopping of the device at the position of Fig. 2, the projection 72 on the forward portion of the member 51 has engaged the forward surface 76 of the plate 65, causing the spring 62 to pull the plate 65 concurrently with the member 51 whereupon the plate 65 moves rearwardly so that the deep slot 69 again engages the lower edge 49 of the bracket opening 48. This is shown in the two positions of the device in the full and dash lines in Fig. 5 wherein the plate 65 is shown in full lines with its shallow slot 68 engaging the ledge 49 at the forwardmost position of the member 51. This structure is also shown in the enlarged detail view of Fig. 6. In Fig. 5 the projection 72 in dash lines abuts the forward edge 76 of the plate 65 just prior to shifting of the plate 65 rearwardly for engagement of the deep slot with the stationary ledge 49.

It is thus apparent that the wagon elevator deflector 35, or, for that matter, any other element to be remotely adjusted, may be positioned in any one of a series of adjustable positions and at the end of the series of adjustments the device may be automatically repositioned for the purpose of repeating the availability of the series of increment adjustments, all of which is accomplished by the successive pulling and releasing of the pull rope 59. The term "rope" comprehends any flexible means, such as a cable, chain, wire or the like.

Numerous details of construction may be varied throughout a wide range without departing from the principles disclosed herein and I therefore do not propose limiting the patent granted hereon otherwise than as necessitated by the appended claims.

What is claimed is:

1. A rope pull remote control for a series of increment adjustments upon successive pulling and releasing of the rope and automatically repeating the procedure when the series of increment adjustments is completed comprising a supporting structure, a bracket fixedly mounted on said supporting structure, said bracket having an opening therethrough, a member slidably positioned through said bracket opening, said member having a series of regularly spaced notches in the under side thereof for engagement with the lower edge of the bracket opening, spring means anchored to said supporting structure and to said member and arranged to urge said member in one direction through said bracket opening, a rope fastened to said member and arranged whereby a pulling thereof acts against the spring means to pull the member in notched increments through the bracket opening in the other direction, and means associated with said member and said opening to effect a raising of the member for releasing the member for sliding movement back through the bracket opening by reason of the action of the spring means.

2. A device as set forth in claim 1 in which each of the regularly spaced notches has an inclined surface and an adjoining vertical surface whereby a pulling of the rope causes the inclined surface of one of the member notches to ride over the lower edge of the bracket opening and to cause a succeeding notch to initially have its vertical surface engage the lower edge of the bracket opening.

3. A device as set forth in claim 2 in which said means associated with the member includes a plate having a dual notch in the underside thereof, said dual notch having a deep slot and a shallow slot, said plate from its shallow slot to its top side being greater in depth than said member, said member having a flange on the upper edge thereof for sliding engagement on the underside by said plate, said plate throughout all regular notch advancement having its deep slot engaging the lower edge of the bracket opening, and spaced projections on said member for engaging said plate to effect concurrent endwise travel of said plate with the member.

4. A device as set forth in claim 3 in which said spaced projections on the member are disposed respectively forwardly of and rearwardly of the series of regularly spaced notches whereby the projection at the rearward end of the member causes the plate to be shifted forwardly when the member is moved forwardly by pulling of the rope and to have the shallow slot of the plate engage the lower edge of the bracket opening whereupon a releasing of the rope causes the spring means to return the member rearwardly its full length so that the forwardly disposed projection engages the front end of the plate causing it to be moved rearwardly with the member to the point where the deep slot engages the lower edge of the bracket opening and the first of the series of notches in the member again engages the lower edge of the bracket opening.

5. A remote control for an elevator load leveling hinged discharge flap comprising an elevator housing, a conveyor in said elevator housing arranged to deliver material to one end thereof for discharge, a deflector flap hinged in the discharge end of said elevator housing, and operating means for varying the angular position of said hinged deflector flap including a rope which upon successive pulling and releasing thereof causes the operating means to change the angular adjustment of the hinged deflector flap throughout a series of adjustments and means at the end of the range of increment adjustments including a spring for automatically repositioning said hinged flap at the beginning of said series of adjustments, and said means operable upon pulling and releasing of the rope.

JOHN L. AASLAND.

References Cited in the file of this patent

UNITED STATES PATENTS

| Number | Name | Date |
|---|---|---|
| 1,082,419 | Gee | Dec. 23, 1913 |
| 2,563,432 | Sterler | Aug. 7, 1951 |